United States Patent

Todd et al.

[11] Patent Number: 5,867,714
[45] Date of Patent: Feb. 2, 1999

[54] SYSTEM AND METHOD FOR DISTRIBUTING CONFIGURATION-DEPENDENT SOFTWARE REVISIONS TO A COMPUTER SYSTEM

[75] Inventors: David K. Todd, Atlanta, Ga.; Michael R. Terrell, Spencerport, N.Y.

[73] Assignee: NCR Corporation, Dayton, Ohio

[21] Appl. No.: 740,584

[22] Filed: Oct. 31, 1996

[51] Int. Cl.[6] ................................................ G06F 9/445
[52] U.S. Cl. .................. 395/712; 395/500; 395/651; 395/653; 707/10; 707/104; 707/201; 707/203
[58] Field of Search .................. 395/712, 500, 395/651, 653, 200.5, 200.51–200.54, 200.47–200.49, 182.01, 182.05, 183.01, 183.03, 183.07, 183.13, 183.14, 183.2, 184.01, 828, 830; 707/1, 10, 104, 200, 201, 203; 364/550, 551.01, 944.61, 946.1, 949.4, 191, 192, 131, 132, 138, 147, 184; 702/119, 112, 123, 183–186, 188

[56] References Cited

U.S. PATENT DOCUMENTS

| | | | |
|---|---|---|---|
| 5,019,963 | 5/1991 | Alderson et al. | 707/201 |
| 5,155,847 | 10/1992 | Kirouac et al. | 395/200.51 |
| 5,247,683 | 9/1993 | Holmes et al. | 395/200.51 |
| 5,287,505 | 2/1994 | Calvert et al. | 707/10 |
| 5,579,529 | 11/1996 | Terrell et al. | 395/828 |
| 5,619,716 | 4/1997 | Nonaka et al. | 395/712 |
| 5,664,093 | 9/1997 | Barnett et al. | 395/183.07 |

*Primary Examiner*—Hal Dodge Wachsman
*Attorney, Agent, or Firm*—William A. Munck

[57] ABSTRACT

There is disclosed a system for detecting and avoiding faults stemming from conflicts in hardware and/or software configurations in a computer system. The system comprises communications circuitry that, from time to time, automatically transmits at least part of the current hardware and software configuration data of the computer system to a remote data source capable of identifying inherent conflicts in the hardware and software configuration. The remote data source then transmits to the computer system software revisions that are capable of resolving the inherent conflicts. After the communications circuitry receives the software revisions, processing circuitry in the computer system modifies the current software configuration according to the received software revisions.

20 Claims, 3 Drawing Sheets

SYSTEM AND METHOD FOR DISTRIBUTING CONFIGURATION-DEPENDENT SOFTWARE REVISIONS TO A COMPUTER SYSTEM

TECHNICAL FIELD OF THE INVENTION

The present invention is directed, in general, to a computing apparatus and, more specifically, to a computer system capable of distributing or receiving software revisions that are a function of a specific system hardware and software configuration.

BACKGROUND OF THE INVENTION

Immeasurable gains in technology offered in personal computers ("PCs") have allowed PCs to assume roles performed only by mainframe or minicomputers in the past. Many companies and individual users rely solely on commercially-available PCs, such as those provided by NCR, to meet their information processing needs. Thus, it is vital that their PCs perform reliably. If, however, a PC experiences a fault, it is equally vital that the PC communicate existence of the fault to inform the user of a need to repair the fault so the PC can return to active service. For computer systems in general, it is most helpful for the computer system itself to provide an indication of the specific location and nature of the fault to help the user more quickly isolate and more economically repair the fault. To that end, today's PCs are typically equipped with some form of internal diagnostics, the purpose of which is to detect and subsequently isolate specific hardware and software component failures and faults brought about by interactions among the PC's hardware and software components (so-called "conflicts" leading to so-called "configuration faults").

For years, PCs have been provided with diagnostic routines that test and report on the operational status or functionality of hardware and software components within the computer, allowing a user to repair or replace hardware or software components that are not functioning to the desired degree or to resolve certain conflicts manually.

As PC systems become more and more complex and as users come more and more to rely on the services of remote, skilled technicians to maintain and repair their PCs, it is growing less desirable to force the user to diagnose PC faults alone. The general direction in the development of diagnostic software systems to this point has been to isolate the user somewhat from the intricate and technically complex operations of diagnostic routines by: (1) providing more user-friendly diagnostic programs to the user, with interfaces written in clear text and presented in an aesthetically pleasing manner and (2) providing remote diagnostic capability so the remote technician may query the PC directly and determine faults without the user's substantial participation. However, the user is still forced to undergo a fault and contact a remote technician for help.

Unlike outright hardware or software failures, conflicts arise quite frequently and are entirely predictable. Quite often, technicians see the same conflicts over and over again. Users having similar hardware and software configurations tend to experience the same conflicts, some earlier than the rest. Therefore, the user may not have had to experience the conflict in the first place.

The solution to such configuration problems usually involves manually correcting the computer's configuration by revising (usually updating) portions (such as libraries and hardware drivers) of the computer's operating system. The remote technician or the user may effect these revisions. Unfortunately, the above-described solutions to the diagnostic problem still require the user to suffer a fault and contact a technician, even if it is an avoidable fault due to a conflict.

In the past, the answer has seemed to lie merely in automating the diagnostic process. For example, U.S. Pat. No. 5,287,505, issued on Feb. 15, 1994, to Calvert, et al., and entitled "On-line Problem Management of Remote Data Processing Systems, Using Local Problem Determination Procedures and a Centralized Database" is directed to automated problem analysis and resolution of a customer data-processing system in which a central service data-processor system communicates with the customer system. Included is a database for converting machine, software and symptom data into instructions, hardware and software module lists, and service call schedules. The customer system detects data concerning its own configuration and problem symptoms for communication to the service system. The service system itself orders repair modules, and electronically communicates software fixes to the customer system.

Unfortunately, Calvert, et al., is expressly directed to repair of a fault once it has occurred and does not provide a means by which to anticipate and avoid faults, particularly configuration faults arising out of hardware/software conflicts.

In the past, some effort has been given to automating the process of software revision to avoid prospective, purely software-based faults. For example, U.S. Pat. No. 5,155,847, issued on Oct. 13, 1992, to Kirouac, et al., and entitled "Method and Apparatus for Updating Software at Remote Locations" is directed to a method and system for updating the software used in remote computer systems from a central computer system. The method includes storing, in the central computer system, copies of the software executable used in each remote computer system. When the copies of the software in the central computer system are upgraded, for example, to correct the software, to add new facilities, to change user interfaces, to make cosmetic changes, to improve performance, etc., each change made to the software is monitored and stored. The remote computer systems are permitted access to the central computer system via communications links and the software in the remote computer systems and the corresponding software in the central computer system are compared. All of the changes that have been made to the software in the central computer system which have not been made to the corresponding software at the remote computer system accessing the central computer are detected. The detected changes are then transmitted to the remote computer system and applied to the software therein in order to upgrade the software in the remote computer system. The upgraded software in the remote computer system is examined to ensure that the software has been changed correctly. The method allows the software at the remote computer systems to be upgraded even while the software at the remote site is being used. The system and method also allow the software used in the remote computer systems to be upgraded when the remote computer systems use different versions of the software and allow the software to be upgraded in a variety of hardware environments and operating systems.

Unfortunately, Kirouac, et al., is directed only at revising application-level software. Kirouac, et al. is not directed to analyzing the complete hardware and software configuration of a computer system in an effort to identify hardware/software conflicts and potential configuration faults. Further, Kirouac, et al., is not directed to revising components of the computer's operating system.

Given that potential faults due to conflicts are diagnosable and readily repairable, what is needed in the art is a system and method for automatically correcting hardware/software conflicts that have potential for causing a fault, preferably well before they actually become faults. The system and method should be capable of distributing or receiving software revisions that are a function of a specific system hardware and software configuration to address the conflict.

SUMMARY OF THE INVENTION

To address the above-discussed deficiencies of the prior art, the present invention provides, for use with a computer system having a hardware and software configuration subject to change over time, a system for, and method of, receiving software revisions as a function of the hardware and software configuration. The system includes: (1) current configuration data, stored in a memory device associated with the computer system, containing a current description of at least a portion of the hardware and software configuration, (2) communications circuitry, associated with the computer system, that automatically establishes a communications link between the computer system and a remote data source to transmit the current configuration data to the remote data source, the remote data source able to identify conflicts inherent in the hardware and software configuration, select configuration-dependent software revisions (revisions that are a function of the hardware and software configuration) and transmit the software revisions to the computer system to address at least some of the conflicts and (3) processing circuitry, associated with the computer system, that modifies a software configuration of the computer system in accordance with the software revisions thereby to avoid a configuration fault.

The above-described system therefore allows at least a portion of a computer's hardware and software configuration to be stored and remotely monitored. If the hardware and software configuration indicates a conflict and therefore a potential configuration fault ahead for the user, the remote data source can distribute the necessary configuration revisions to address the conflict and thereby avoid the configuration fault entirely. In this way, valuable user and technician time can be saved.

The remote data source should preferably be able to identify conflicts inherent in the hardware and software configuration. Most preferably, the power of identification is had by experience. In other words, when a user or other party (such as a manufacturer) identifies or experiences a fault brought about by a conflict, the knowledge required to identify the conflict and the necessary configuration revisions are added to the remote data source. Thus, the remote data source acts as a conflict and revision database. However, this need not be the case. The remote data source may alternatively take the form of an expert system that is able to identify conflicts before anyone experiences them.

In one embodiment of the present invention, the remote data source comprises a registration database containing other data pertaining to the computer system, the remote data source able to identify the conflicts by analyzing the current configuration data and the other data.

Often, proper diagnosis of a conflict is enhanced when information about the computer system, other than configuration data, is known. The other data may comprise, for instance, the make, model and serial number of the computer system and data indicating the personal working habits of the computer system's user. Of course, still other data may be desired; the present invention is not limited by the type of data used for diagnosis and revision.

In one embodiment of the present invention, the communications circuitry periodically automatically establishes the communications link between the computer system and the remote data source. This may, most advantageously, result in nightly or weekend contacts for the purpose of receiving configuration revisions. Of course, the present invention is not limited to automatic, periodic contact; the user may contact the remote data source at will or aperiodically.

In one embodiment of the present invention, the system further comprises configuration detection circuitry that detects changes in the hardware and software configuration and automatically alters the current configuration data as a function thereof. Preferably, the user does not need to intervene in altering the current configuration data. The computer system can be programmed to perform the function automatically. However, the broad scope of the present invention certainly encompasses manual alteration of the current configuration data by the user.

In one embodiment of the present invention, the software revisions include revisions to operating system software stored in nonvolatile memory associated with the computer system. As previously described, conflicts are often resolved by revising portions of the computer's operating system, some of which may reside in nonvolatile memory (such as Electrically-Erasable Programmable Read-Only Memory ("EEPROM")) within the computer system. However, the broad scope of the present invention is not so limited. Revisions may be made to other operating system software or to application programs.

In one embodiment of the present invention, the current configuration data includes usage pattern tracking data. The usage pattern tracking data may be employed to monitor the manner in which the user employs the computer system. Thus, the present invention may be regarded as not only a solver of potential problems, but also as a finder of opportunity. As will be explained in greater detail below, the present invention may be employed to allow a manufacturer to track how its customers are using their computers, giving the manufacturer specific access and insight to its customers' needs and allowing the manufacturer to target its customer base with appropriate advertising.

In one embodiment of the present invention, the communications circuitry establishes the communications link via a selected one of a telecommunications system and a computer network. Thus, the present invention, in its broadest form, contemplates any mode of contact to effect the communications link.

Another aspect of the present invention provides a system for automatically distributing configuration-dependent software revisions, comprising: (1) a central data source, (2) a plurality of remote computer systems, each of the plurality of remote computer systems having an associated system for receiving software revisions from the central data source, the associated system including: (2a) current configuration data containing a current description of at least a portion of a hardware and software configuration of the associated remote computer system, (2b) communications circuitry that automatically establishes a communications link between the remote computer system and the central data source to transmit the current configuration data to the central data source and receive software revisions from the central data source in response thereto and (2c) processing circuitry, associated with the remote computer system, that modifies a software configuration of the computer system in accordance with software revisions and (3) revision selection circuitry, associated with the central data source that receives current configuration data from the plurality of remote computer systems, identifies conflicts inherent in the hardware and software configurations of the plurality of remote computer systems, selects software revisions as a function of the hardware and software configurations and transmits the software revisions to respective ones of the remote computer system to address at least some of the conflicts. In alternate embodiments, the revision selection circuitry may identify conflicts inherent in the hardware and software configuration of a single computer system, select software revisions as a function of that hardware and software configuration and transmit the software revisions to the computer system to address at least some of the conflicts.

An advantageous embodiment for employing or distributing the present invention is as software. The software embodiment includes a plurality of processing system instructions that may suitably be stored to a conventional storage medium. Preferred storage media include without limitation magnetic, optic and electric, as well as suitably arranged combinations of the same. The processing system instructions are readable and executable by one or more computer or processing systems to distributing configuration-dependent software revisions to a computer system in accordance with the principles of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which like numbers designate like parts and in which.

DETAILED DESCRIPTION

Figure 1:
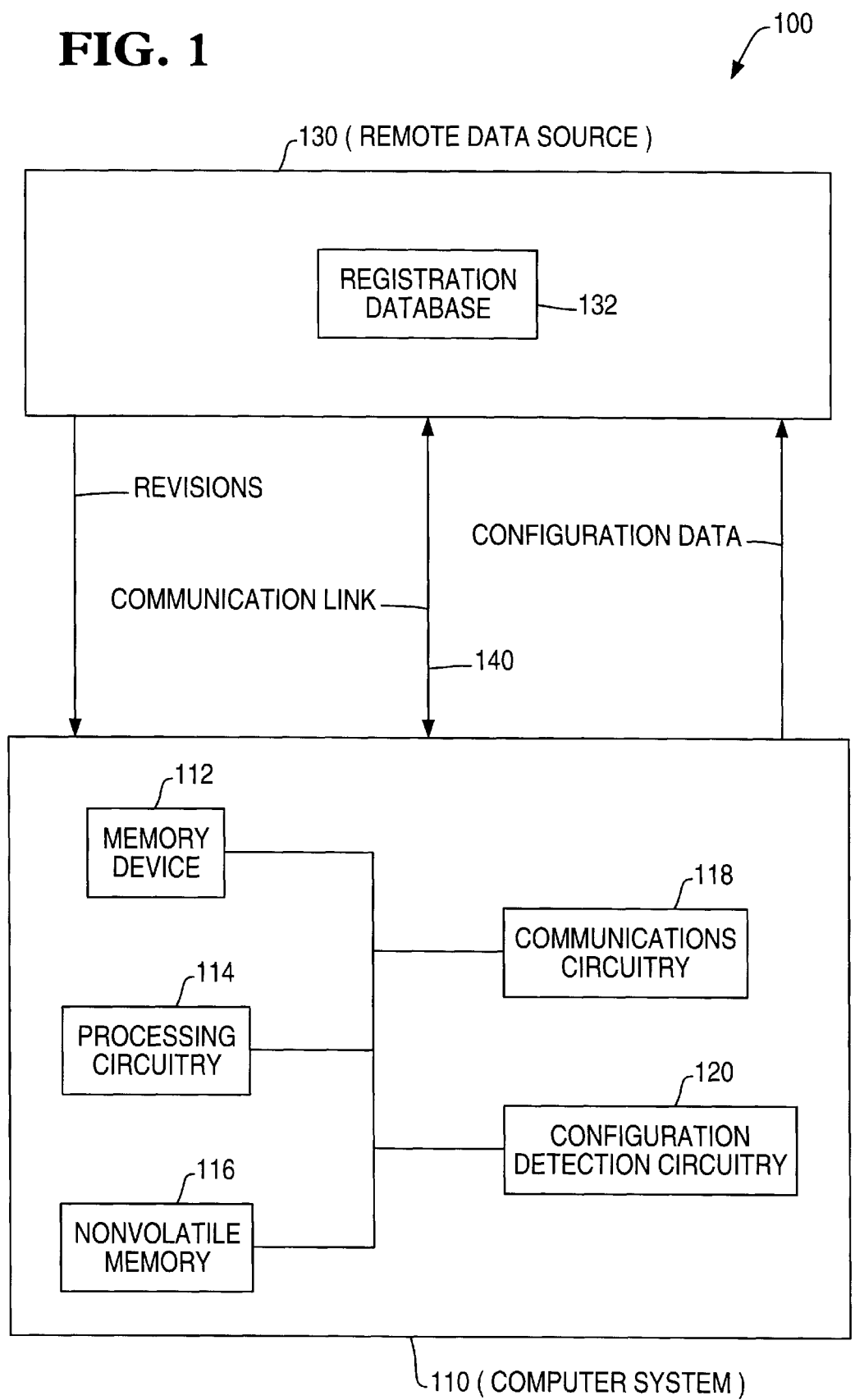
FIG. 1 illustrates a block diagram of a system constructed according to the principles of the present invention.

Referring initially to FIG. 1, illustrated is a block diagram of a system constructed according to the principles of the present invention. The system, generally designated 100, is illustrated as residing locally on a computer system 110 (which may advantageously be a PC or any other conventional suitably arranged processing system), using existing circuitry within the computer system 110 to perform novel functions according to the present invention. "Or," as the term is used herein, is inclusive, meaning and/or.

The computer system 110 is illustrated as including a memory device 112 (which may be random access memory ("RAM"), read-only memory ("ROM"), a conventional mass storage device, such as a floppy or hard disk drive, or the like). "Include," as the term is used herein, means inclusion without limitation. The memory device 112 is conventionally capable of storing data of many types. However, the present invention advantageously employs the memory device 112 to store current configuration data pertaining to the hardware and software configuration of the computer system 110. The kind of data contained in the current configuration data will be set forth in greater detail below.

The computer system 110 is further illustrated as including processing circuitry 114. The processing circuitry 114 generally governs the flow of software instructions and substantive data within the computer system 110. In FIG. 1, the processing circuitry 114 is used to provide, among other things, read/write access to the memory device 112.

The computer system further includes nonvolatile memory 116. The nonvolatile memory 116 may be ROM, EEPROM or a conventional mass storage device and may be used to store, among other things, operating system software components, such as hardware drivers (not shown). In conventional PC systems, the nonvolatile memory employed for this purpose is ROM or EEPROM. Because the revisions distributed according to the present invention may suitably include revisions to operating system components stored in the nonvolatile memory 116, it is advantageous that the nonvolatile memory 116 be EEPROM, such that the revisions may be written to the nonvolatile memory 116.

The computer system 110 is further illustrated as including communications circuitry 118. The communications circuitry 118 may be, for example, a modem (allowing the computer system 110 to communicate via a telecommunications system (not shown)) or a network interface card ("NIC") (allowing the computer system 110 to communicate via a computer network (not shown)). It should be understood, however, that the present invention in its broadest form is indifferent to the type of system or mode of communication in which the communications circuitry 118 is designed to operate.

The computer system 110 further includes configuration detection circuitry 120. The configuration detection circuitry 120 is responsible for obtaining data pertaining to at least a portion of the current hardware and software configuration of the computer system 110. The configuration detection circuitry 120 may be as simple as a software program, executable within the computer system 110, for querying the user as to the current hardware and software configuration. More preferably, however, the configuration detection circuitry 120 determines the hardware and software configuration automatically, by polling hardware components and cataloging software components to create a list of current configuration data setting forth the components that comprise the computer system 110. Such a list might read as follows:

| COMPUTER | |
|---|---|
| Manufacturer Name: | Dell Computer Corp. |
| Manufacturer No. | 99999 |
| Serial No. | 99999 |
| Computer Name | Generic AT Compatible |
| ID Bytes | FC, 01 (IBM AT 339) |
| Bus | ISA (16 bit) |
| Processor | Cyrix 486DLC, 50 Mhz |
| CPU State | V8086 Mode, A20 On |

-continued

| | |
|---|---|
| Coprocessor | Cyrix 80387, 50 Mhz |
| Setup Type | CMOS RAM |
| Clock | CMOS |
| BIOS/DOS | |
| BIOS Mfr | AMI |
| BIOS Size | 64K |
| DOS Version | 7.00 |
| BIOS Date | 06/06/92 |
| PRIMARY VIDEO | |
| Copyright 1988–1991 TRIDENT MICROSYSTEMS INC | |
| Adapter | VESA |
| RAM Size | 1,024K |
| Video BIOS | Trident |
| Chip Set | Unknown |
| VESA Installed | Yes (Version 1.02) |
| Max Resolution | 1280X1024, 16 colors (106h) |
| Max Colors | 640X480, 16777216 colors (112h) |
| Max Text Mode | 132X60, 16 colors (10ch) |
| Monitor | VGA Color |
| SECONDARY VIDEO | |
| No Adapter | |
| PHYSICAL MEMORY | |
| Base... Total | 640K |
| Available | 619K |
| Upper Memory... Total | 156K |
| Largest Block | 0K |
| Extended... Total | 7,168K |
| Available | None |
| MANAGED MEMORY | |
| XMS... Total | 14,044K |
| Available | 6,876K (taken from Extended Memory) |
| HMA | 64K (in-use) |
| Version | 3.00 |
| Driver Rev. | 3.5 |
| EMS... | No Driver Installed |
| HARD DRIVE 0 | |
| Total Size | 169M |
| DOS Free | 11M |
| Partition 1 | Big DOS (C:) |
| Size | 169M |
| Partition 2 | Not Defined |
| Partition 3 | Not Defined |
| Partition 4 | Not Defined |
| BIOS Geometry | 902 Cyls, 8 Heads, 46 Sectors |
| Real Geometry | Unknown |
| Interleave | (undetermined) |
| Sectors Wasted | Unknown |
| CMOS Type | 47 |
| Best Match | 47 |
| Interface | IDE/ESDI (BIOS driver) |
| Encoding | Advanced |
| Translated | Unknown |
| Model | Unknown |
| Rev. | N/A |
| Manufacturer No. | N/A |
| HARD DRIVE 1 | |
| Total Size | 169M |
| DOS Free | 11M |
| Partition 1 | Big DOS (D:) |
| Size | 169M |
| Partition 2 | Not Defined |
| Partition 3 | Not Defined |
| Partition 4 | Not Defined |
| BIOS Geometry | 902 Cyls, 8 Heads, 46 Sectors |
| Real Geometry | Unknown |
| Interleave | (undetermined) |
| Sectors Wasted | Unknown |
| CMOS Type | 47    Best Match: 47 |
| Interface | IDE/ESDI (BIOS driver) |
| Encoding | Advanced |
| Translated | Unknown |
| Model | Unknown |
| Rev | N/A |

-continued

| | |
|---|---|
| Mfr S/N | N/A |
| FLOPPY DRIVE 0 | |
| Size | 1.2M(5.25") |
| DOS Name | A: |
| Geometry | 80 Tracks, 2 Heads, 15 Sectors |
| Media Support | 1.2M High Density |
| | 360K Double Density |
| Disk Size | (no disk in drive) |
| FLOPPY DRIVE 1 | |
| Size | 1.44M(3.5") |
| DOS Name | B: |
| Geometry | 80 Tracks, 2 Heads, 18 Sectors |
| Media Support | 1.44M High Density |
| | 720K Double Density |
| Disk Size | (no disk in drive) |
| SERIAL PORTS | |
| Port 0 | DOS |
| Name | COM1: |
| I/O Address | 3F8h |
| Chip Type | 16550A |
| FIFO | No |
| Settings | 2400 Baud, None, 8, 1 |
| Port 1 | No Port |
| Port 2 | No Port |
| Port 3 | No Port |
| PARALLEL PORTS | |
| Port 0 | DOS |
| Name | LPT1: |
| I/O Address | 378h |
| Bidirectional | No |
| Port 1 | No Port |
| Port 2 | No Port |
| VIDEO | |
| Adapter | VESA |
| Monitor | VGA Color |
| Max Colors | 640X480, 16777216 colors (112h) |
| Max Resolution | 1280X1024, 16 colors (106h) |
| SOUND | |
| Sound Device | Sound Blaster Compatible |
| Compatibility: | Sound Blaster, Adlib |
| Features | FM Synthesis |
| | Digital Playback |
| | Microphone Input |
| Interface | Internal Card |
| I/O Address | 220h |
| Version | 3.0 |
| CD-ROM | |
| Interface | Microsoft CD-ROM Extensions |
| Driver | MSCDEX.EXE |
| Version | 2.23 |
| DOS Name(s) | E: |
| KEYBOARD | |
| Type | 101-key Enhanced |
| Num Lock | On |
| Caps Lock | Off |
| Scroll Lock | Off |
| MOUSE | |
| Type | Serial (2 button) |
| Speed | Medium |
| Driver Revision | 8.48 |
| MODEM 1 | |
| Not Determined Yet | |
| MODEM 2 | |
| Not Determined Yet | |
| FAX | |
| No FAX Found | |

| | Interrupt Vectors Usage | | |
|---|---|---|---|
| 00h | Divide Error | 0520:0139 | Available |
| 01h | Debug Exceptions | 0070:0465 | DOS Kernel |
| 02h | Non-Maskable Interrupt | 0520:025E | Available |
| 03h | Breakpoint | 0070:0465 | DOS Kernel |
| 04h | Overflow | 0070:0465 | DOS Kernel |
| 05h | Print Screen Handler | F000:FF54 | System ROM |
| 06h | Invalid Opcode | F000:EB43 | System ROM |
| 07h | No Coprocessor | F000:EAEB | System ROM |
| 08h | IRQ0-Timer | 0498:0000 | vmm32 |
| 09h | IRQ1-Keyboard | CE69:0028 | UMB |
| 0Ah | IRQ2-EGA Vert. Retrace | CE69:003A | UMB |
| 0Bh | IRQ3-COM2 | CE69:0052 | UMB |
| 0Ch | IRQ4-COM1 | CE69:006A | UMB |
| 0Dh | IRQ5 | CE69:0082 | UMB |
| 0Eh | IRQ6-Diskette | CE69:009A | UMB |
| 0Fh | IRQ7-Printer | 0070:0465 | DOS Kernel |
| 10h | Video | DC17:000A | UMB |
| 11h | Equipment Determination | F000:F84D | System ROM |
| 12h | Mem. Size Determination | F000:F841 | System ROM |
| 13h | Diskette & Fixed Disk | FD5B:2532 | System ROM |
| 14h | Serial | F000:E739 | System ROM |
| 15h | System Services | 0251:053A | EMM386 |
| 16h | Keyboard | 0070:042D | DOS Kernel |
| 17h | Printer | CC9D:0A28 | UMB |
| 18h | Transfer to ROM BASIC | F000:E000 | System ROM |
| 19h | Bootstrap Loader | | |
| 1Ah | Timer & Real-Time Clock | F000:FE6E | System ROM |
| 1Bh | Ctrl-Break | CC9D:0604 | UMB |
| 1Ch | Clock Tick | 0498:001D | vmm32 |
| 1Dh | Video Init Tables | F000:F0A4 | System ROM |
| 1Eh | Diskette Parameters | | |
| 1Fh | Graphics Set 2 | C000:4E16 | Video ROM |
| 20h | DOS Prog. Termination | 00C9:0FA8 | DOS Kernel |
| 21h | DOS System Services | CC9D:04A0 | UMB |
| 22h | DOS Terminate Address | FDA9:2052 | System ROM |
| 23h | DOS Ctrl-C Address | FD45:2692 | System ROM |
| 24h | Critical Error Handler | 03B6:080B | WIN |
| 25h | DOS Absolute Disk Read | 00C9:0FBC | DOS Kernel |
| 26h | DOS Absolute Disk Write | 00C9:0FC6 | DOS Kernel |
| 27h | Terminate Stay Resident | 00C9:0FD0 | DOS Kernel |
| 28h | DOS Keyboard Busy Loop | 00C9:106F | DOS Kernel |
| 29h | DOS Fast Putchar | 0070:0466 | DOS Kernel |
| 2Ah | NETBIOS, Other Networks | CC9D:05B4 | UMB |
| 2Bh | Reserved for DOS | 00C9:106F | DOS Kernel |
| 2Ch | Reserved for DOS | 00C9:106F | DOS Kernel |
| 2Dh | Reserved for DOS | 00C9:106F | DOS Kernel |
| 2Eh | DOS Internal EXECUTE | 03A8:0000 | WIN Data |
| 2Fh | Multiplex | 03B6:03CC | WIN |
| 30h | CP/M JMP Command | C90F:E4EA | UMB |
| 31h | DPMI | F000:EA00 | System ROM |
| 32h | Reserved for DOS | 00C9:106F | DOS Kernel |
| 33h | MOUSE | 0492:0001 | vmm32 |
| 34h | Floating Pt. Emulation | 152E:0306 | Available |
| 35h | Floating Pt. Emulation | 152E:0306 | Available |
| 36h | Floating Pt. Emulation | 152E:0306 | Available |
| 37h | Floating Pt. Emulation | 152E:0306 | Available |
| 38h | Floating Pt. Emulation | 152E:0306 | Available |
| 39h | Floating Pt. Emulation | 152E:0306 | Available |
| 3Ah | Floating Pt. Emulation | 152E:0306 | Available |
| 3Bh | Floating Pt. Emulation | 152E:0306 | Available |
| 3Ch | Floating Pt. Emulation | 152E:0306 | Available |
| 3Dh | Floating Pt. Emulation | 152E:0306 | Available |
| 3Eh | Floating Pt. Emulation | 152E:03C6 | Available |
| 3Fh | Overlay & DLL Managers | 00C9:106F | DOS Kernel |
| 40h | Orig Diskette Handler | F000:EC59 | System ROM |
| 41h | 1st Fixed Disk Params | F000:E13D | System ROM |
| 42h | Orig Video Handler | F000:F065 | System ROM |
| 43h | EGA/VGA UserFontTable | C000:5216 | Video ROM |
| 44h | EGA/VGA Fonts | F000:EA97 | System ROM |
| 45h | Unused | F000:EA97 | System ROM |
| 46h | 2nd Fixed Disk Params | F000:E14D | System ROM |
| 47h | SQL Base API | F000:EA97 | System ROM |
| 48h | Unused | F000:EA97 | System ROM |
| 49h | Unused | F000:EA97 | System ROM |
| 4Ah | User Alarm | F000:EA97 | System ROM |
| 4Bh | Unused | FD49:2652 | System ROM |
| 4Ch | Unused | F000:EA97 | System ROM |
| 4Dh | Unused | F000:EA97 | System ROM |
| 4Eh | Unused | F000:EA97 | System ROM |
| 4Fh | Unused | 0070:04FC | DOS Kernel |
| 50h | DESQviewRelocated IRQ0 | F000:EA97 | System ROM |
| 51h | DESQviewRelocated IRQ1 | F000:EA97 | System ROM |
| 52h | DESQviewRelocated IRQ2 | F000:EA97 | System ROM |
| 53h | DESQviewRelocated IRQ3 | F000:EA97 | System ROM |
| 54h | DESQviewRelocated IRQ4 | F000:EA97 | System ROM |
| 55h | DESQviewRelocated IRQ5 | F000:EA97 | System ROM |
| 56h | DESQviewRelocated IRQ6 | F000:EA97 | System ROM |
| 57h | DESQviewRelocated IRQ7 | F000:EA97 | System ROM |
| 58h | Reserved | F000:EA97 | System ROM |
| 59h | GSS Graphics Interface | F000:EA97 | System ROM |
| 5Ah | Cluster Adapter BIOS | F000:EA97 | System ROM |
| 5Bh | Used by Cluster Adapter | F000:EA97 | System ROM |
| 5Ch | NETBIOS & TOPS API | 04C0:0009 | vmm32 |
| 5Dh | Reserved | F000:EA97 | System ROM |
| 5Eh | Reserved | F000:EA97 | System ROM |
| 5Fh | Reserved | F000:EA97 | System ROM |
| 60h | Nets, PC_IPC, SYS_PROF | 0000:0000 | <Null> |
| 61h | Reserved for User Intr | 0000:0000 | <Null> |
| 62h | Reserved for User Intr | 0000:0000 | <Null> |
| 63h | Reserved for User Intr | 0000:0000 | <Null> |
| 64h | Novell Low-Level API | 0000:0000 | <Null> |
| 65h | Reserved for User Intr | 0000:0000 | <Null> |
| 66h | Reserved for User Intr | 0000:0000 | <Null> |
| 67h | LIM, EMS, VCPI | 0493:0040 | vmm32 |
| 68h | APPC/PC | F000:EA97 | System ROM |
| 69h | Reserved for User Intr | F000:EA97 | System ROM |
| 6Ah | OPTHELP | F000:EA97 | System ROM |
| 6Bh | Ungermann-Bass NETCI | F000:EA97 | System ROM |
| 6Ch | DOS 3.2 Real-Time Clock | F000:EA97 | System ROM |
| 6Dh | Reserved for VGA | C000:0E76 | Video ROM |
| 6Eh | Unused | F000:EA97 | System ROM |
| 6Fh | Novell PCOX API, 10-NET | F000:EA97 | System ROM |
| 70h | IRQ8-Real-Time Clock | CE69:0035 | UMB |
| 71h | IRQ9 | F000:EED2 | System ROM |
| 72h | IRQ10 | CE69:00B2 | UMB |
| 73h | IRQ11 | CE69:00CA | UMB |
| 74h | IRQ12 | CE69:00E2 | UMB |
| 75h | IRQ13-Coprocessor Error | F000:EEDB | System ROM |
| 76h | IRQ14-Fixed Disk | CE69:00FA | UMB |
| 77h | IRQ15 | | |

DOS Device Drivers

| Seg:Off | Attr | Size | Name | Descrip./Characteristics |
|---|---|---|---|---|
| 00C9:0E0F | 8004h | | NUL | |
| CC9D:040B | D000h | 159,744 | IFS$HLP$ | NULL DeviceUMB: |
| C992:0881 | C800h | | MSCD001 | NULL DeviceUMB: |
| C95D:001E | 8000h | | SETVERXX | DOS 5.0 SETVER |
| 0251:0086 | C000h | | $MMXXXX0 | DOS 5.0 SETVER |
| 0251:004C | C000h | | $MMXXXX0 | DOS 5.0 SETVER (inactive) |
| 0208:0047 | A000h | | XMSXXXX0 | Extend. Mem. Man. (XMS) |
| 0070:0290 | 8013h | | CON | Screen/Keyboard Handler DOS 2.x, STDIN, STDOUT |
| 0070:02A2 | 8000h | | AUX | Default Serial Device |
| 0070:02B4 | A0C0h | | PRN | Default Printer Device DOS 3.2, IOCTL |
| 0070:02C6 | 8008h | | CLOCK$ | Real-Time Clock DOS 2.x, CLOCK |
| 0070:02D8 | 08C2h | | A:−D: | DOS Drive(s) DOS 3.2, STDOUT, IOCTL, Removable |
| 0070:02E4 | 8000h | | COM1 | Serial Port |
| 0070:02F6 | A0C0h | | LPT1 | Parallel Port DOS 3.2, IOCTL |
| 0070:0308 | A0C0h | | LPT2 | Parallel Port DOS 3.2, IOCTL |
| 0070:031A | A0C0h | | LPT3 | Parallel Port DOS 3.2, IOCTL |
| 0070:03A7 | C000h | | CONFIG$ | Screen/Keyboard Handler DOS 3.2, IOCTL |
| 0070:0332 | 8000h | | COM2 | Serial Port |
| 0070:0344 | 8000h | | COM3 | Serial Port |
| 0070:0356 | 8000h | | COM4 | Serial Port |

-continued

| | | | |
|---|---|---|---|
| 0493:0039 | C000h | 1,904 | &MMXXXX0 Serial Portvmm32: |
| 049B:0016 | C800h | mscd$$$$ | Serial Portvmm32: vmm32: |

System CMOS Settings

Real Time Clock  Video Adapter
Date: 08/11/96   Time: 11:01:19   EGA/VGA or beyond
Floppy Drives    Memory
Type 2: 1.2M(5.25")   Base: 640K
Type 4: 1.44M(3.5")   Extended: 7,168K
Hard Drives      CMOS Status
Type 47:         Battery: OK
Extended or Invalid Entry   Checksum: OK (0a38)
Type 47:         CMOS Type: Standard AT
Extended or Invalid Entry   Size: 128 Bytes Hardware IRQ Usage IRQ 0  | In-Use | System Timer    vmm32
IRQ 1  | In-Use | Keyboard        UMB
IRQ 2  | N/A    | [Cascade]
IRQ 3  | FREE   |                 UMB,BIOS
IRQ 4  | In-Use | COM1:           UMB,BIOS
IRQ 5  | FREE   |                 UMB,BIOS
IRQ 6  | In-Use | Floppy Disk     UMB,BIOS
IRQ 7  | In-Use | LPT1:           DOS Kernel
IRQ 8  | In-Use | Clock/Calendar  UMB
IRQ 9  | FREE   |                 UMB,BIOS
IRQ 10 | FREE   |                 UMB,BIOS
IRQ 11 | FREE   |                 UMB,BIOS
IRQ 12 | FREE   |                 UMB,BIOS
IRQ 13 | In-Use | 80387           BIOS
IRQ 14 | In-Use | Fixed Disk      UMB,BIOS
IRQ 15 | FREE   |                 BIOS
DEVICES WITH NO IRQ:             VESA
DEVICES WITH AN UNKNOWN IRQ:     Sound Card, Network Card Software Installed Word for Windows         v6.0
Manage Your Money        v8.5
WinFax Pro               v2.0
Excel                    v4.0
Lotus Notes              v2.0
cc:Mail Remote           v3.5
Calendar Creator         v1.0
AT&T Tourguide Tutorial  v1.5

End

Those of ordinary skill in the art should understand that the above list of current configuration data is given by way of example only, both in form and content. The list may include installation and revision dates, Basic Input/Output System ("BIOS") and hardware driver version numbers and serial numbers. Further, the list need not be a complete recitation of the computer system's entire hardware and software configuration, but is advantageously sufficient to allow reliable remote identification of conflicts. Most advantageously, the list may be automatically compiled by any software program adhering to the Desktop Management Interface ("DMI") specification, Version 1.0 or greater (promulgated by the Desktop Management Task Force ("DMTF")), into a commonly-recognized form per the DMTF PC Systems Management Interface File ("MIF") specification, Version 1.0 or greater.

Figure 2A:
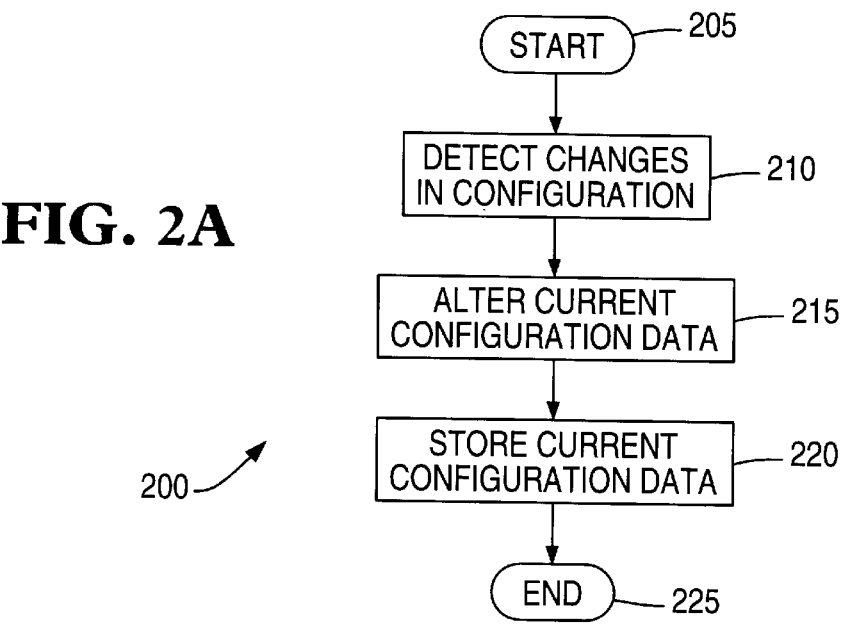
FIG. 2A illustrates a flow diagram of a method of ensuring that configuration data are current.
Figure 2B:
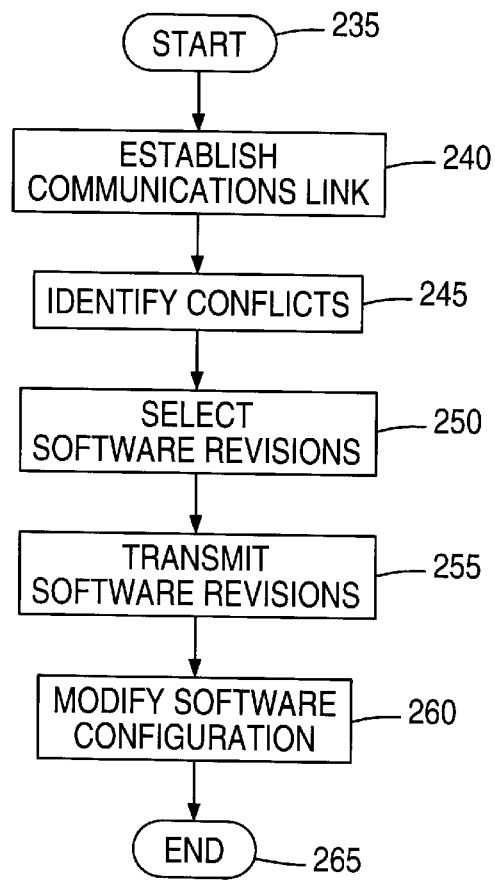
FIG. 2B illustrates a flow diagram of a method of establishing a communications link and receiving software revisions.

As will be set forth in greater detail with respect to FIG. 2B, the processing circuitry 114 preferably controls the memory device 112, the nonvolatile memory 116, the communications circuitry 118 and the configuration detection circuitry 120 to provide an environment wherein current configuration data may be collected and transmitted as desired.

FIG. 1 further illustrates a remote data source 130. The remote data source 130 may advantageously take the form of a computer system, but need not. The remote data source 130 preferably contains a database of software revisions that may be communicated to the computer system 110 as a function of the current configuration data transmitted from the computer system 110 to the remote data source 130 and diagnostic and analytic processes within the remote data source 130 that analyzes the current configuration data to identify conflicts.

Again, the knowledge needed to identify such conflicts is probably best acquired by experience. In other words, when a user or other party (such as a manufacturer) identifies or experiences a fault brought about by a conflict, the knowledge required to identify the conflict and the necessary configuration revisions supplement the diagnostic and analytic process in the remote data source. In this manner, the remote data source acts strictly as a conflict and revision database. As stated above, however, this need not be the case. The remote data source may alternatively take the form of an expert system that is sufficiently powerful to identify conflicts before anyone experiences them.

The remote data source 130 may include on-line documentation revisions. For instance, in the list of current configuration data given above, the computer system 110 is shown as having the AT&T Tourguide Tutorial, version 1.5 installed. Perhaps revisions to on-line help and tutorial documentation have been made to that version of the Tutorial. In such case, the remote data source 130 can detect that the documentation should be revised, and can respond automatically, much to the user's benefit.

The remote data source 130 may further include promotional data. The promotional data is not used for solving problems that the user may have, but, instead, is directed to communicating opportunities to the user in a targeted fashion. For instance, in the list of current configuration data given above, the computer system's processor is a 50 Mhz Cyrix 486DLC, the total computer memory is 8 megabytes (640K base memory plus 7,168K extended memory) and the computer system is running Word for Windows, version 6.0. The remote data source 130 may suggest that the user obtain an upgrade on the processor and memory, given that the user is running Word for Windows 6.0.

When combined with usage pattern tracking data, the advantages of this present invention may be dramatic. For example, the remote data source 130 may adjust its processor and memory upgrade suggestions as a function of the amount of time the user actually spends running Word for Windows 6.0, as opposed to one of the other application programs. As technology advances, the remote data source 130 may begin to suggest that the user replace the computer system 110 outright and may help the user smoothly transition from one computer system to another by automatically assessing configuration possibilities. The remote data source 130 may also be employed in an automated ordering process, wherein the user can automatically order processor or memory upgrades, for example, without having to interact with sales personnel.

The remote data source 130 is illustrated as including a registration database 132. The registration database 132 may include data describing those computer systems that are licensed or otherwise qualified to receive analysis and software revision. This allows the remote data source 130 to be the subject of a subscription-based service. Further, the registration database may include warranty information that manages warranty obligations.

The remote data source 130 may advantageously be equipped to contact the user via telephone to inform the user that software revisions are pending or have been effected. The remote data source 130 may employ the telephone to instruct the user as to how to effect the revisions, if the user's assistance or approval is desired.

Finally, a communications link 140 couples the computer system 110 and the remote data source 130 for communication of data therebetween. Again, current communications data preferably flows from the computer system 110 to the remote data source 110, while software revisions preferably flow from the remote data source 130 to the computer system 110 in response thereto. The communications link may be effected by means of a telecommunications system (by way of MODEMs at each of the computer system 110 and the remote data source 130) or a computer network (by way of NICs), such as the Internet.

It should be noted that although each of computer system 110 and remote data source 130 are illustrated as single processing systems, each may, in point of fact, be a network of processing systems. In alternate embodiments, each may also suitably be replaced by, or combined with, any conventional processing system operative in accordance with the principles of the present invention, including sophisticated calculators, and hand-held, laptop/notebook, mini, mainframe and super computers, telephony systems (e.g., sound, video, data, etc.), message paging systems, personal communication systems, home entertainment systems, network portal devices and the like, as well as network combinations of the same.

Conventional computer system architecture is more fully discussed in *Computer Organization and Architecture,* by William Stallings, MacMillan Publishing Co. (3rd ed. 1993); conventional processing system network design is more fully discussed in *Data Network Design,* by Darren L. Spohn, McGraw-Hill, Inc. (1993); and conventional data communications is more fully discussed in *Data Communications Principles,* by R. D. Gitlin, J. F. Hayes and S. B. Weinstein, Plenum Press (1992) and in *The Irwin Handbook of Telecommunications,* by James Harry Green, Irwin Professional Publishing (2nd ed. 1992), each of which is incorporated herein by reference for all purposes.

Turning now to FIG. 2A, illustrated is a flow diagram of a method of ensuring that configuration data stored in the memory device 112 of FIG. 1 are current. The method, generally designated 200, is straightforward and begins with a start step 205 wherein an update to the current configuration data is deemed desirable. The update may be regularly scheduled, invoked only when necessary or invoked at the user's specific request.

Once invoked, a change in the computer system's current configuration is detected in a step 210. The configuration detection circuitry 120 of FIG. 1 may perform this step.

Next, the current configuration data are updated in steps 215 and 220. The current configuration data that need to be updated may be read from the memory device 112, updated and written back to the memory device 112. Alternatively, updates to the current configuration data may be directly written to the memory device 112, causing superseded portions of the current configuration data to be overwritten. Following the updating, the method 200 ends in an end step 225.

Turning now to FIG. 2B, illustrated is a flow diagram of a method of establishing a communications link and receiving software revisions. As with the method of FIG. 2A, the method of FIG. 2B, generally designated 230, begins with a start step 235 wherein establishment of a communications link with the remote data source (130 of FIG. 1) is deemed desirable. Contact may be regularly scheduled, invoked only when necessary or invoked at the user's specific request and is performed in a step 240, wherein the computer system 110 transmits its current configuration data to the remote data source 130.

Today's PCs may be equipped with power-saving features that allow them to awaken automatically to perform functions. One example of a recognized standard for such power-saving features is the Intel Advanced Power Management Specification, version 1.1. Such PCs can be programmed to awaken at off-hours to contact the remote data source 130 for updates at a time that does not present an inconvenience to the user.

Following transmission of the current configuration data, the remote data source 130 analyzes the current configuration data, identifying conflicts (in a step 245) that may cause trouble for the user in the future. If the remote data source 130 identifies a conflict, the remote data source 130 then selects software revisions (in a step 250 and usually from a library of revisions) as a function of the identified conflicts.

Next, in a step 255, the remote data source 130 transmits the software revisions to the computer system 110. In response, the computer system 110 preferably applies the software revisions (in a step 260), modifying its software configuration to avoid potential configuration faults. The computer system 110 may apply the software revisions automatically or may simply queue the software revisions and prompt the user for his approval before actually applying the software revisions to change the configuration of the computer system 110. The computer system 110 may alternatively present the user a menu, giving the user the option as to which of the revisions are to be effected. The user thus may be given a choice as to which revisions are actually applied. Once the software revisions are applied, the method 230 ends in an end step 265.

Figure 3:
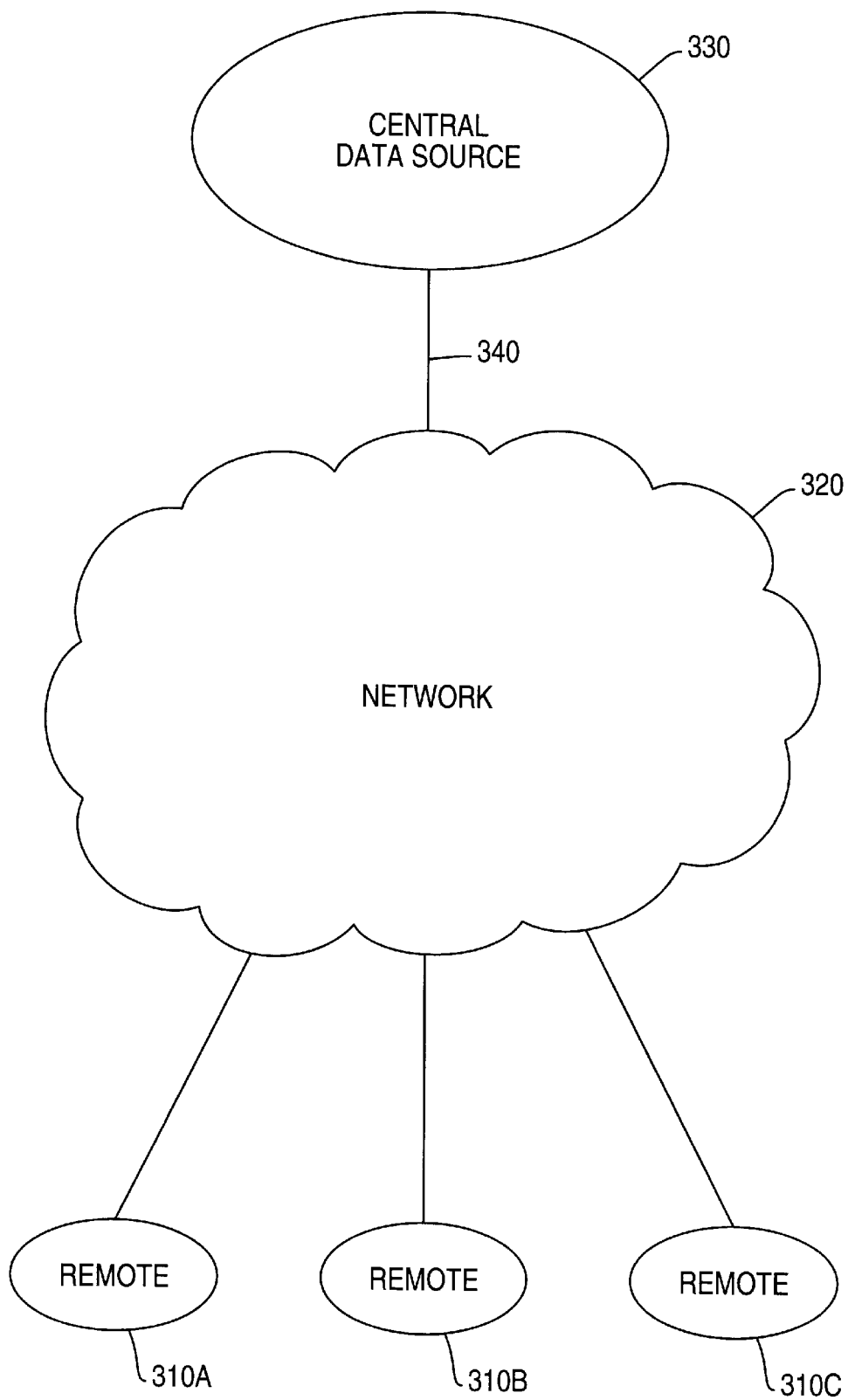
FIG. 3 illustrates a block diagram of a centralized system for automatically distributing configuration-dependent software revisions.

Turning now to FIG. 3, illustrated is a block diagram of a centralized system for automatically distributing configuration-dependent software revisions. FIG. 3 essentially recasts FIG. 1 to assume the vantage point of the remote data source 130. In FIG. 3, the remote data source (130 of FIG. 1) is a central data source 330, responsible for analyzing current configuration data from a plurality of remote computer systems 310A, 310B, 310C and delivering, in response thereto, software updates that are appropriate to any conflicts that may be found. As required, communications links between the central data source 330 and the plurality of computer systems 310A, 310B, 310C are by way of a network 320. The network 320 may be a telecommunications or computer network, as appropriate.

It should be readily apparent that the various circuitries, controllers and the like may equivalently be implemented in a variety of alternative hardware, firmware and software embodiments without departing from the spirit and scope of the invention as claimed herein. In alternate hardware implementations, for example, the various circuitries, controllers and the like of the illustrative embodiment may, in whole or in part, be replaced, or combined with, other suitable processing circuitry, including programmable logic devices, such as programmable array logic ("PALs") and programmable logic arrays ("PLAs"), digital signal processors ("DSPs"), field programmable gate arrays ("FPGAs"), application specific integrated circuits ("ASICs"), very large scale integrated circuits ("VLSIs") or the like.

Although the present invention has been described in detail, those skilled in the art should understand that they can make various changes, substitutions and alterations herein without departing from the spirit and scope of the invention in its broadest form.

What is claimed is:

1. For use with a computer system having a hardware and software configuration subject to change over time, a system for receiving software revisions as a function of said hardware and software configuration, comprising:

current configuration data, stored in a memory device associated with said computer system, containing a current description of at least a portion of said hardware and software configuration;

communications circuitry, associated with said computer system, capable of automatically establishing a communications link between said computer system and a remote data source capable of identifying inherent conflicts in said hardware and software configuration and selecting software revisions operable to resolve said inherent conflicts, transmitting said current configuration data to said remote data source and receiving said software revisions; and processing circuitry, associated with said computer system, capable of modifying a software configuration of said computer system in accordance with said software revisions.

2. The system as recited in claim 1 wherein said remote data source comprises a registration database containing other data pertaining to said computer system, said remote data source able to identify said inherent conflicts by analyzing said current configuration data and said other data.

3. The system as recited in claim 1 wherein said communications circuitry periodically automatically establishes said communications link between said computer system and said remote data source.

4. The system as recited in claim 1 further comprising configuration detection circuitry that detects changes in said hardware and software configuration and automatically alters said current configuration data as a function thereof.

5. The system as recited in claim 1 wherein said software revisions include revisions to operating system software stored in nonvolatile memory associated with said computer system.

6. The system as recited in claim 1 wherein said current configuration data includes usage pattern tracking data.

7. The system as recited in claim 1 wherein said communications circuitry establishes said communications link via a selected one of a telecommunications system and a computer network.

8. For use with a computer system having a hardware and software configuration subject to change over time, a method of receiving software revisions as a function of said hardware and software configuration, comprising the steps of:

storing current configuration data in a memory device associated with said computer system, said current configuration data containing a current description of at least a portion of said hardware and software configuration;

automatically establishing a communications link between said computer system and a remote data source and transmitting said current configuration data to said remote data source;

in said remote data source, identifying inherent conflicts in said hardware and software configuration;

in said remote data source, selecting, as a function of said hardware and software configuration, software revisions capable of resolving said inherent conflicts;

transmitting said software revisions to said computer system to address at least some of said conflicts; and modifying a software configuration of said computer system in accordance with said software revisions.

9. The method as recited in claim 8 wherein said remote data source comprises a registration database containing other data pertaining to said computer system, said remote data source able to identify said inherent conflicts by analyzing said current configuration data and said other data.

10. The method as recited in claim 8 wherein said step of automatically establishing comprises the step of periodically automatically establishing said communications link between said computer system and said remote data source.

11. The method as recited in claim 8 further comprising the steps of:

detecting changes in said hardware and software configuration; and automatically altering said current configuration data as a function thereof.

12. The method as recited in claim 8 wherein said software revisions include revisions to operating system software stored in nonvolatile memory associated with said computer system.

13. The method as recited in claim 8 wherein said current configuration data includes usage pattern tracking data.

14. The method as recited in claim 8 wherein said step of automatically establishing comprises the step of establishing said communications link via a selected one of a telecommunications system and a computer network.

15. A system for automatically distributing configuration-dependent software revisions, comprising:

a central data source;

a plurality of remote computer systems, each of said plurality of remote computer systems having an associated system for receiving software revisions from said central data source, said associated system including:

current configuration data containing a current description of at least a portion of a hardware and software configuration of said associated remote computer system, communications circuitry capable of automatically establishing a communications link between said remote computer system and said central data source, transmitting said current configuration data to said central data source and receiving software revisions from said central data source in response thereto, and processing circuitry, associated with said remote computer system, that modifies a software configuration of said computer system in accordance with software revisions; and revision selection circuitry, associated with said central data source, capable of receiving current configuration data from said plurality of remote computer systems, identifying inherent conflicts in said hardware and software configurations of said plurality of remote computer systems, selecting software revisions as a function of said hardware and software configurations and transmitting said software revisions to respective ones of said remote computer systems to address at least some of said conflicts.

16. The system as recited in claim 15 wherein said central data source comprises a registration database containing other data pertaining to said plurality of remote computer systems, said revision selection circuitry able to identify said inherent conflicts by analyzing said current configuration data and said other data.

17. The system as recited in claim 15 wherein said communications circuitry periodically automatically establishes said communications link between said associated remote computer system and said central data source.

18. The system as recited in claim 15 wherein said associated system comprises configuration detection circuitry that detects changes in said hardware and software configuration and automatically alters said current configuration data as a function thereof.

19. The system as recited in claim 15 wherein said software revisions include revisions to operating system software stored in nonvolatile memory associated with said associated remote computer system.

20. The system as recited in claim 15 wherein said current configuration data includes usage pattern tracking data.

* * * * *